United States Patent

Shiratori et al.

[11] Patent Number: 5,197,831
[45] Date of Patent: Mar. 30, 1993

[54] CUTTING INSERT FOR BALL END MILL

[75] Inventors: Hidehisa Shiratori; Tatsuo Arai; Masayuki Okawa, all of Ibaraki, Japan

[73] Assignee: Mitsubishi Materials Corporation, Tokyo, Japan

[21] Appl. No.: 833,652

[22] Filed: Feb. 11, 1992

[30] Foreign Application Priority Data

Mar. 15, 1991 [JP] Japan .................................. 3-15494

[51] Int. Cl.$^5$ .............................................. B23C 5/20
[52] U.S. Cl. ...................................... 407/114; 407/42; 407/116
[58] Field of Search ........................... 407/34, 40–42, 407/48, 53, 54, 61, 62, 113, 114, 115, 116

[56] References Cited

U.S. PATENT DOCUMENTS

| 3,383,748 | 5/1968 | Galimberti et al. | 407/114 |
| 3,968,550 | 7/1976 | Gehri | 407/114 |
| 4,367,990 | 1/1983 | Porat et al. | 407/114 |
| 4,527,930 | 7/1985 | Harroun | 407/42 |
| 4,898,499 | 2/1990 | Tsujimura et al. | 407/54 X |

FOREIGN PATENT DOCUMENTS 3832087  3/1989  Fed. Rep. of Germany .

Primary Examiner—Steven C. Biship
Attorney, Agent, or Firm—Cushman, Darby & Cushman

[57] ABSTRACT

A cutter insert for a ball end mill is disclosed which includes a plate-like insert body having a front face and a side face extending from the front face. The front face has a generally convexly curved marginal ridge defined by the intersection of the front face with the side face. The marginal ridge serves as a cutting edge. The front face serves as a rake surface for the cutting edge while the side face serves as a relief surface for the cutting edge. The cutting edge has a leading portion to be indexed in the end cutting position and a trailing portion to be indexed in the peripheral cutting position. A land is formed on the rake surface so as to extend along the cutting edge. The land has a width gradually increasing in a direction from the leading portion of the cutting edge toward the trailing portion thereof.

4 Claims, 4 Drawing Sheets

CUTTING INSERT FOR BALL END MILL

BACKGROUND OF THE INVENTION

1. Field of the Invention

The present invention relates to a cutting insert attached to a ball end mill for use in manufacturing dies or the like.

2. Related Art

FIGS. 7 and 8 depict a related art cutting insert which can be suitably employed for the ball end mill of the aforesaid type. The insert, generally designated by the numeral 1, comprises a plate-like insert body 2 having a front face serving as a rake surface 3 and having a pair of side faces serving as relief surfaces 4. The marginal ridges 5 defined by the intersections of the front face with the side faces serve as a pair of cutting edges 8, each of which is comprised of a convexly curved leading portion 6 of a quadrantal shape and a trailing portion 7 extending from the leading portion 6 so as to be tangential therewith. In addition, an arcuately-shaped groove serving as a chip breaker 9 is formed in the rake surface 3 so as to extend along each cutting edge 8, and a strap-like land 10 is formed between each cutting edge 8 and the chip breaker 9 extending therealong. Furthermore, the insert body 2 has a central aperture 11 formed therethrough.

As shown in FIG. 9, the cutting insert as described above is received in an insert-receiving recess 13 of an end mill body 12, with the convexly curved leading portion 6 of one of the cutting edges 8 being indexed in an end cutting position and with the trailing portion 7 thereof being indexed in a peripheral cutting position, and is releasably secured thereto by threading a clamp screw 14 through the aperture 11 into the end mill body 12.

In a cutting insert to be used in a turning operation, a chip breaker is basically provided in order to break off the chips produced. However, in the above related art insert 1 for a ball end mill which is employed in a milling operation, the chip breaker 9 is mainly provided in order to reduce the cutting load exerted thereon. The chip breaker 9 provided for this purpose may be formed of a uniform width along the entire length of the cutting edge 8, or may be formed such that the width gradually increases in a direction from the leading portion 6 of the cutting edge 8 toward the trailing portion 7 thereof. In either case, although the width of the land 10 is set relatively small so as to be no larger than 0.1 mm and is uniform along the entire length of the cutting edge 8, the chip breaker 9 is formed so as to have a relatively large width. Accordingly, the chips produced during the cutting operation are guided smoothly along the relatively wide chip breaker 9, so that the cutting load exerted on the cutting insert during the cutting operation can be reduced.

In the cutting insert 1 as described above, however, the cutting load exerted thereon increases toward the trailing portion 7 of the cutting edge 8, so that the trailing portion 7 is susceptible to fracturing or chipping. The reasons for this will now be explained with reference to FIG. 10, which depicts the relationships between portions $P_1$, $P_2$, $P_3$ of the cutting edge 8 and the thicknesses t of a chip cut by these portions. In the drawing, F, C, $H_1$, and $H_2$ denote the feed direction of the end mill, the axis of rotation of the end mill, the locus of rotation generated by the cutting edge 8, and the locus of rotation generated by the cutting edge 8 when the end mill is fed transversely by a prescribed feed amount, respectively. In this illustration, the thickness $t_1$ of the chip cut by the portion $P_1$ of the active cutting edge 8, which is perpendicular to the feed direction, is equal to the amount of feed. On the other hand, with respect to the chip cut by the portions $P_2$, $P_3$ of the cutting edge 8, although the thicknesses measured in the feed direction are equal to $t_1$, the actual thicknesses, i.e., the thicknesses measured in a direction normal to the locus of rotation, are gradually decreased toward the foremost end of the cutting edge 8. Thus, the thickness of the chip gradually increases in a direction from the leading portion 6 of the cutting edge 8 toward the trailing portion 7 thereof, and this means that the cutting load exerted on the cutting edge 8 gradually increases from the leading portion 6 toward the trailing portion 7. As a result, the trailing portion 7 of the cutting edge 8 is subjected to an unduly large cutting load, and hence the cutting edge 8 is susceptible to fracturing or chipping.

In order to circumvent the above disadvantage, the land width may be enlarged. However, if the land width is simply enlarged, the cutting load exerted on the leading portion 6 of the cutting edge 8 becomes excessive, so that smooth cutting cannot be ensured.

SUMMARY OF THE INVENTION

It is therefore an object and feature of the present invention to provide a cutting insert in which sufficient strength can be ensured over the entire length of the cutting edge while substantially reducing the cutting load exerted thereon.

According to the present invention, there is provided a cutter insert for a ball end mill comprising a plate-like insert body having a front face and a side face extending from the front face, the insert body having a generally convexly curved marginal ridge defined by the intersection of the front face with the side face, the marginal ridge serving as a cutting edge, the front face serving as a rake surface for the cutting edge while the side face serves as a relief surface for the cutting edge, the cutting edge having a convexly curved leading portion to be indexed in the end cutting position and a trailing portion to be indexed in the peripheral cutting position, the insert body having a land formed on the rake surface so as to extend along the cutting edge, the land having a width gradually increasing in a direction from the leading portion of the cutting edge toward the trailing portion thereof.

Thus, in the cutting insert of the present invention, the width of the land is defined such that the land width increases gradually in a direction from the leading portion of the cutting edge to the trailing portion thereof. Accordingly, the land width at the leading portion is small, and the cutting edge has a tip of small thickness, so that the cutting load exerted thereon can be reduced. On the other hand, the land width at the trailing portion of the cutting edge is large, and hence a sufficient thickness can be ensured at the tip of the cutting edge. As a result, the trailing portion of the cutting edge comes to have a great strength to such an extent that it can endure a large cutting load.

DESCRIPTION OF THE PREFERRED EMBODIMENTS OF THE INVENTION

Figure 1:
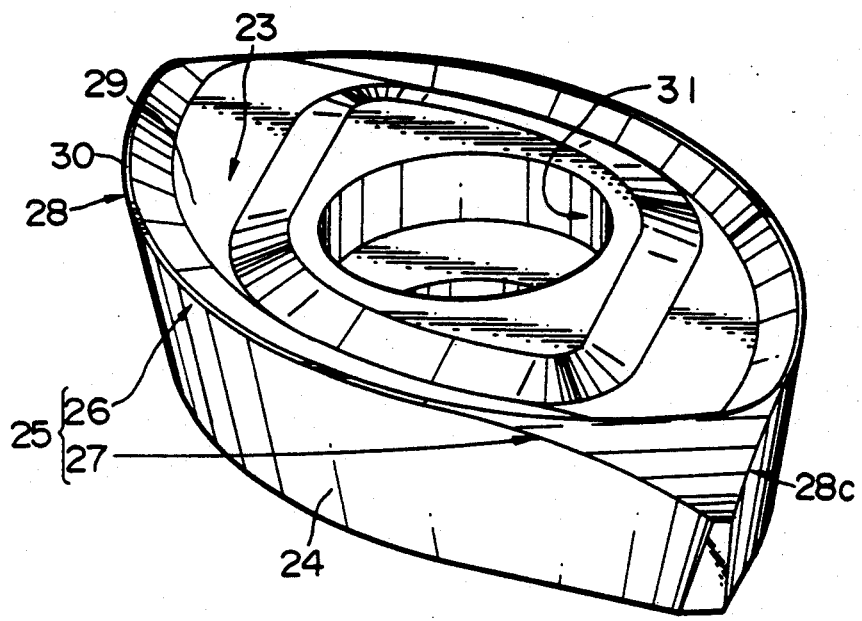
FIG. 1 is an enlarged perspective view of a cutting insert in accordance with an embodiment of the present invention.
Figure 2:
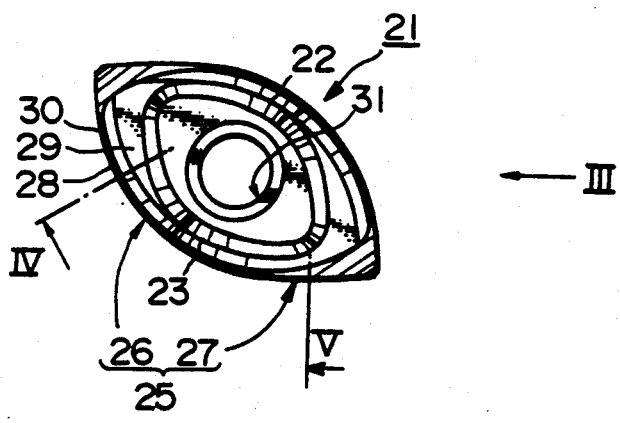
FIG. 2 is a plan view of the insert of FIG. 1.
Figure 3:
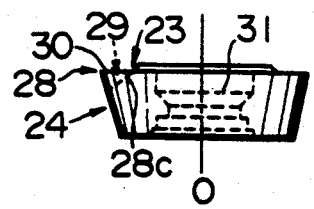
FIG. 3 is a side elevational view of the insert of FIG. 1 as seen in the direction indicated by the arrow III in FIG. 2.

FIGS. 1 to 5 depict an indexable cutter insert 21 of a positive type in accordance with an embodiment of the present invention, which comprises a plate-like insert body 22 of a generally elliptical shape having a front face, a rear face and a pair of side faces joining the front and rear faces. The insert body 22 has a pair of generally convexly curved marginal ridges 25 each defined by the intersection of the front face with a respective side face, and each marginal ridge 25 defines a cutting edge 28. The front face serves as a rake surface 23 for the cutting edges 28, whereas each of the side faces serves as a relief surface 24 for a respective cutting edge 28. The cutting edge 28 is comprised of a convexly curved leading portion 26 and a trailing portion 27 extending from the leading portion 26 so as to be tangential therewith. As the rake surface 23 is viewed, the leading portion 26 is of a generally quadrantal shape, whereas the trailing portion 27 is of a substantially straight shape. An arcuately-shaped groove or recess of a shallow channel shaped cross-section is formed in the rake surface 23 so as to extend along each of the cutting edges 28, to thereby provide a chip breaker 29.

In addition, that portion of the front face defined between each cutting edge 28 and the chip breaker 29 extending therealong defines a land 30. The land 30 is defined such that the land width $n_{11}$ at the leading portion 26 of the cutting edge 28 is smaller than the width $n_{12}$ at the trailing portion 27 of the cutting edge 28, i.e., the land width increases gradually in a direction from the leading portion 26 of the cutting edge 28 to the trailing portion 27 thereof. In the illustrated embodiment, the land 30 is formed such that the land width $n_{11}$ at the leading portion 26 of the cutting edge 28 ranges from 0 to 0.2 mm, while the land width $n_{12}$ at the trailing portion 27 thereof ranges from 0.1 to 0.3 mm. As the above numerical range indicates, the land 30 may not be necessarily provided over the entire length of the cutting edge 28.

Figure 4:
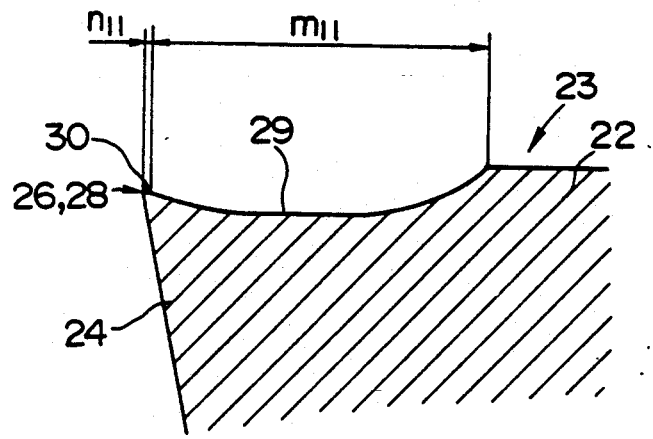
FIG. 4 is an enlarged cross-sectional view of a part of the insert of FIG. 1 taken along the line IV in FIG. 2.
Figure 5:
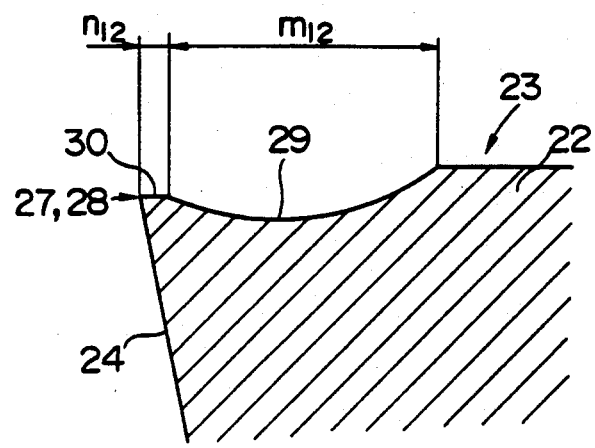
FIG. 5 is a view similar to FIG. 4, taken along the line V in FIG. 2.
Figure 6:
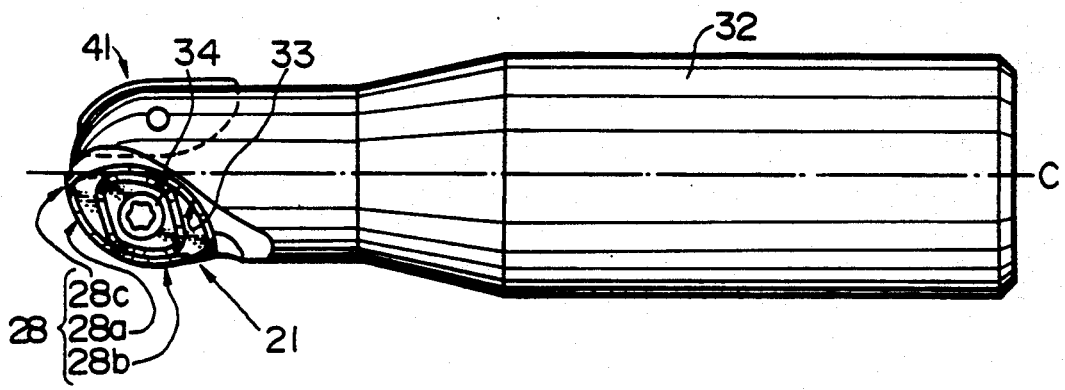
FIG. 6 is a side elevational view of a ball end mill to which the insert of FIG. 1 is attached.
Figure 7:
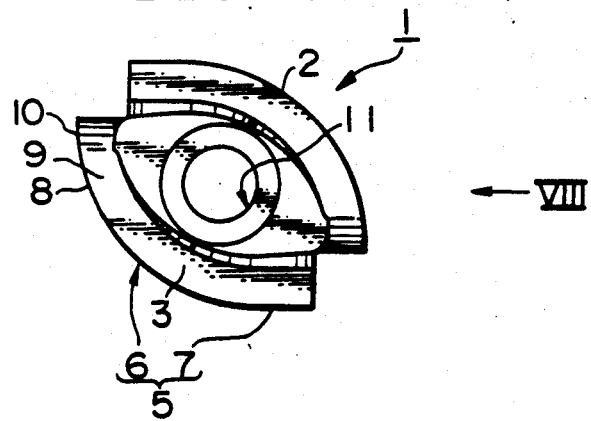
FIG. 7 is a plan view of a related art cutting insert.
Figure 8:
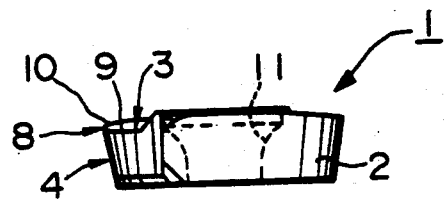
FIG. 8 is a side elevational view of the insert of FIG. 7 as seen in the direction indicated by the arrow VIII in FIG. 7.
Figure 9:
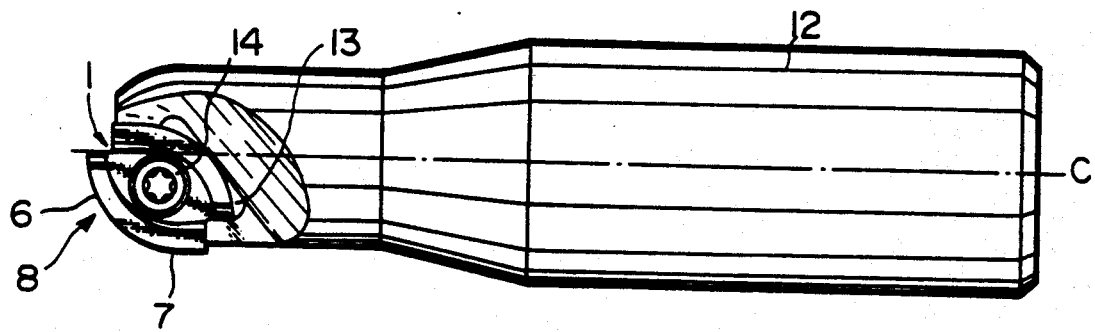
FIG. 9 is a side elevational view of a ball end mill to which the insert of FIG. 7 is attached.
Figure 10:
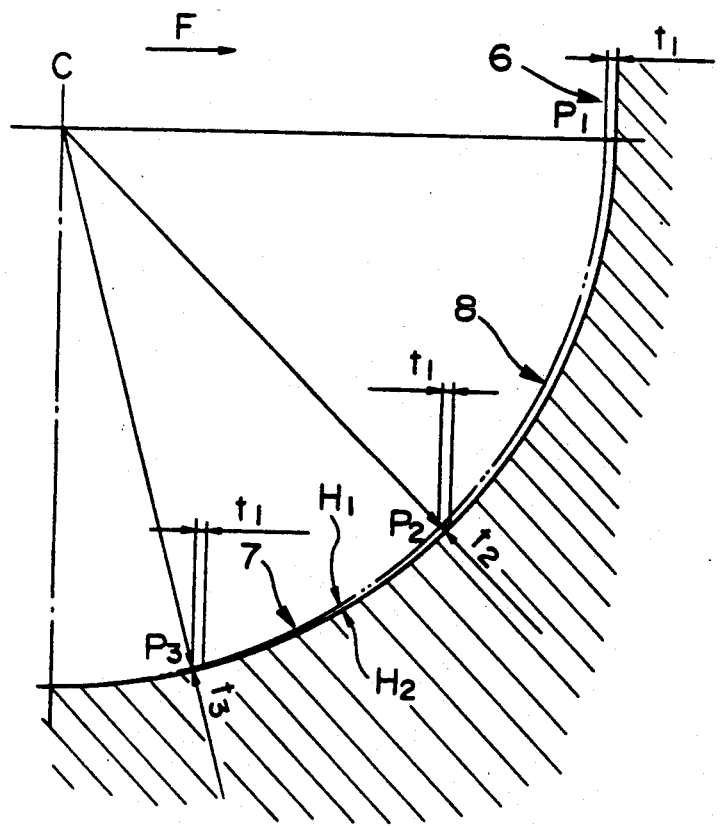
FIG. 10 is a view showing the relationship between the cutting edge portions which cut a workpiece and the thicknesses of chips cut thereby.

Furthermore, as shown in FIGS. 4 and 5, the chip breaker 29 is formed such that the breaker width $m_{11}$ at the leading end portion 26 of the cutting edge 28 is larger than the width $m_{12}$ at the trailing portion 27 of the cutting edge 28. That is, contrary to the width of the land, the width of the breaker decreases gradually in a direction from the leading portion 26 to the trailing end portion 27.

Moreover, as is the case with the related art insert, a central aperture 31 is formed through the center O of the cutting insert so as to pass through the insert in a direction of its thickness. Accordingly, it is preferable that the width $m_{12}$ of the aforesaid chip breaker 29 at the trailing portion 27 of the cutting edge 28 be made as large as possible to an extent that the breaker 29 does not interfere with the central aperture 31. On the other hand, the width $m_{11}$ of the chip breaker 29 at the leading portion 26 does not interfere the central aperture 31, and hence the width $m_{11}$ can be made sufficiently large. However, having taken into consideration the strength of the insert body 22 itself, the width $m_{11}$ is preferably set to about 1.5 to 3 times the width $m_{12}$.

The cutting insert 21 as described above is received in the insert-receiving recess 33 of the end mill body 32, with the convexly curved leading portion 26 of one of the cutting edges 28 being indexed in an end cutting position and with the trailing portion 27 thereof being indexed in a peripheral cutting position, and is releasably secured thereto by threading a clamp screw 34 through the aperture 31 into the end mill body 32. Furthermore, in the illustrated embodiment, another insert-receiving recess 33 is formed in the forward end portion of the end mill body 32 in diagonally opposite relation to the first-mentioned recess 32, and a cutting insert 41, in which the cutting edge has a shorter leading portion but longer trailing portion than the insert 21, is releasably attached thereto. In addition, that portion of the cutting edge 28 of the insert 21 disposed adjacent to the axis C of the end mill body 32 is convexly curved as the relief surface is viewed, so that the strength of the inner end portion of the cutting edge 28 is highly enhanced.

When a workpiece is subjected to milling operation using the ball end mill of the above construction, relatively thick chips are produced by the trailing portion 27 of the cutting edge 28, while relatively thin chips are produced by the leading portion 26 of the cutting edge 28. Thus, the cutting load exerted on the cutting edge 28 during the cutting operation is gradually increased from the leading portion 26 of the cutting edge 28 to the trailing portion 27 thereof, and becomes the largest at the peripheral end of the cutting edge 28, which corresponds to the bounds of cutting.

However, in the above cutting insert 21, the width of the land 30 is defined such that the land width increases gradually in a direction from the leading portion 26 of the cutting edge 28 to the trailing portion 27 thereof. Accordingly, the land width $n_{11}$ at the leading portion 26 is small, and the cutting edge 28 has a tip of small thickness, so that the cutting load exerted thereon can be reduced. On the other hand, the land width $n_{12}$ at the trailing portion 27 of the cutting edge 28 is large, and hence a sufficient thickness can be ensured at the tip of the cutting edge. As a result, the trailing portion 27 of the cutting edge 28 comes to have a great strength to such an extent that it can withstand a large cutting load. In particular, sufficiently high strength can be maintained at the peripheral end of the cutting edge 28, which corresponds to the bounds of cutting, so that the fracturing or chipping of such a portion of the cutting edge can be positively avoided in advance.

In the foregoing, if the land width $n_{11}$ at the leading portion 26 of the cutting edge 28 and the land width $n_{12}$ at the trailing portion 27 thereof are set so as to exceed 0.2 mm and 0.3 mm, respectively, the thicknesses of the tips of these portions become excessive, so that the cutting loads exerted thereon are unduly increased. On the other hand, if the land width $n_{12}$ at the trailing portion 27 of the cutting edge 28 is set so as to be less than 0.1 mm, the thickness of the tip thereof becomes unduly thin, so that the resulting cutting edge 28 could not withstand the cutting load exerted thereon during the cutting operation.

Furthermore, in the illustrated embodiment, the chip breaker 29 is formed such that the breaker width decreases gradually in a direction from the leading portion 26 of the cutting edge 28 to the trailing portion 27 thereof. With this construction, the relatively thin chips produced by the leading portion 26, indexed in the end cutting position, are freely curled and discharged, and the cutting resistance caused during the cutting operation can be substantially reduced. On the other hand, since the chip breaker 29 is formed relatively narrow at the trailing portion 27 of the cutting edge 28, the chips cut by the trailing portion 27 are forcibly discharged from the chip breaker 29, and hence neither increase of the cutting load nor jamming of the chips occurs. Thus, in the cutting insert 21 of the present embodiment, the cutting load exerted thereon during the cutting operation can be effectively reduced.

Obviously many modifications and variations of the present invention are possible in the light of the above teachings. For example, although in the above embodiment, the inner portion of the cutting edge 28 disposed adjacent to the axis of rotation is formed so as to be convexly curved, as viewed in side elevation, in order to enhance its strength, the inner portion may be honed instead. In addition, the insert may be a so-called negative insert.

What is claimed is:

1. A cutting insert for a ball end mill comprising a plate-like insert body having a front face and a side face extending from said front face, said insert body having a generally convexly curved marginal ridge defined by the intersection of said front face with said side face, said marginal ridge serving as a cutting edge, said front face serving as a rake surface for said cutting edge while said side face serves as a relief surface for said cutting edge, said cutting edge having a convexly curved leading portion to be indexed in an end cutting position and a trailing portion to be indexed in a peripheral cutting position, said insert body having a land formed on said rake surface so as to extend along said cutting edge, said land having a width gradually increasing in a direction from said leading portion of said cutting edge to said trailing portion thereof, said insert body having a chip breaking portion defined by a groove formed in said rake surface so as to extend along said cutting edge, said chip breaking portion having a width gradually decreasing in a direction from said leading portion of said cutting edge to said trailing portion thereof.

2. A cutting insert as recited in claim 1, wherein the width of said land at said leading portion is no greater than 0.2 mm, while the width of said land at said trailing portion ranges from 0.1 to 0.3 mm.

3. A cutting insert as recited in claim 1, wherein said leading portion of said cutting edge is of a quadrantal shape as viewed from said rake surface, whereas said trailing portion extends from said leading portion so as to be tangential therewith and is of a convexly curved shape as viewed from said relief surface.

4. A cutting insert as recited in claim 1, wherein the width of said land at said leading portion is set so as to be 1.5 to 3 times the width of said land at said trailing portion.

* * * * *